US006485771B1

(12) United States Patent
Somerville et al.

(10) Patent No.: US 6,485,771 B1
(45) Date of Patent: Nov. 26, 2002

(54) EDIBLE COMPOSITIONS INCLUDING PARTICULATED GEL

(75) Inventors: Rodney John Somerville, Greenacre (AU); Brad Alexander Forrest, Mt. Colah (AU)

(73) Assignee: Danisco Australia Pty Ltd, Botany (AU)

( * ) Notice: Subject to any disclaimer, the term of this patent is extended or adjusted under 35 U.S.C. 154(b) by 0 days.

(21) Appl. No.: 09/403,326

(22) PCT Filed: Apr. 21, 1998

(86) PCT No.: PCT/AU98/00283

§ 371 (c)(1),
(2), (4) Date: Mar. 21, 2000

(87) PCT Pub. No.: WO98/47390

PCT Pub. Date: Oct. 29, 1998

(30) Foreign Application Priority Data

Apr. 22, 1997 (AU) .............................................. PO6374
Sep. 15, 1997 (AU) .............................................. PO9188

(51) Int. Cl.[7] .............................. A23L 1/05; A23L 1/06
(52) U.S. Cl. ........................ 426/573; 426/519; 426/565; 426/576; 426/577; 426/578; 426/579

(58) Field of Search ................................. 426/249, 573, 426/576, 578, 577, 579, 565, 519

(56) References Cited

U.S. PATENT DOCUMENTS

| 4,500,553 | A | | 2/1985 | Liggett et al. |
| 4,517,216 | A | * | 5/1985 | Shim ........................... 426/573 |
| 4,717,571 | A | | 1/1988 | Okonogi et al. |
| 5,498,439 | A | * | 3/1996 | Bonner ....................... 426/650 |
| 6,093,438 | A | * | 7/2000 | Vaghela et al. ............. 426/565 |

FOREIGN PATENT DOCUMENTS

| EP | 574973 | 12/1983 |
| WO | WO 96/21362 | 7/1996 |

* cited by examiner

*Primary Examiner*—Nina Bhat
(74) *Attorney, Agent, or Firm*—Wood, Phillips, Katz, Clark & Mortimer

(57) ABSTRACT

An edible composition has a first part including a first particulated gel and at least one other part including a second particulated gel, the first part being substantially unmixed with the other part or parts. An edible composition includes a particulated gel in a continuous phase of a hydrocolloid gel. A process for the preparation of such edible compositions is provide.

15 Claims, 3 Drawing Sheets

EDIBLE COMPOSITIONS INCLUDING PARTICULATED GEL

This application claims benefit under 35 U.S.C. 371 of PCT/AU98/00283 filed Apr. 21, 1998.

TECHNICAL FIELD

The present invention relates to frozen and non-frozen edible compositions which include particulated gels, and to processes for the preparation of such edible compositions.

BACKGROUND OF THE INVENTION

Gels of various types have been used in food and food products for many years. Indeed, naturally occurring gelling materials have long found a use in traditional food preparation.

Among known gels which find use in food production are particulated gels which are caused to set under the application of shear, causing a gel to form in particles of a size which depends on the constituents of the gel and the amount of shear applied. Also used in food production are conventionally set gels, which are prepared by causing a solution of a gelling component to set, substantially in the absence of shear.

Using such gels, together with other ingredients, gelled food products having a variety of textures may be obtained. However, there is a continuing consumer demand for food products, including gelled food products, having an increased variety of textures and/or appearances. Accordingly, there is a need for food products having novel textures and/or appearances, compared to food products which are currently obtainable.

It is therefore an object of the present invention to provide an edible composition which includes a particulated gel and has a novel texture and/or appearance, and to provide a process for the preparation of such an edible composition.

Surprisingly, it has been found by the present inventors that the rheological properties of a particulated gel are such that it may be filled into a suitable container with one or more other particulated gels in such a way that the particulated gels substantially do not mix, giving rise to a range of edible compositions of novel texture and/or appearance.

SUMMARY OF THE INVENTION

According to a first embodiment of the present invention there is provided an edible composition having a first part including a first particulated gel and at least one other part including a second particulated gel, said first part being substantially unmixed with said other part or parts.

According to a second embodiment of the present invention there is provided a process for preparing an edible composition, including providing a first part including a first particulated gel and providing at least one other part including a second particulated gel, filling said first part into a container and filling said other part or parts into said container substantially without mixing said first part with said other part or parts.

According to a third embodiment of the present invention there is provided an edible composition, including a particulated gel suspended in a continuous phase of a hydrocolloid gel.

According to a fourth embodiment of the present invention there is provided a process for preparing an edible composition including a particulated gel suspended in a continuous phase of a hydrocolloid gel, the process including providing a solution including a first gelling component and a hydrocolloid component, causing said first gelling component to gel under the application of shear, thereby forming a particulated gel, and thereafter causing said hydrocolloid component to gel.

DETAILED DESCRIPTION OF THE INVENTION

As used herein, the terms "substantially unmixed" and "substantially without mixing" mean that each part in the edible composition is distinguishable to the eye or by taste or mouthfeel from the other part or parts of the edible composition.

A particulated gel in an edible composition of the invention is prepared from any gelling agent or agents capable of forming a particulated gel under appropriate conditions. Typically, the gelling agent or agents are selected from the group consisting of gellan (native or de-acylated), agar, alginate, modified alginates such as propylene glycol alginate, pectin, iota-carrageenan, kappa-carrageenan and furcelleran. The gelling agents for preparing the particulated gel in the first and other parts of the edible composition of the first embodiment may be the same or different. Usually, the parts of the edible composition of the first embodiment are different in texture, colour and/or flavour. The gelling agent which produces the particulated gel in an edible composition of the invention may be caused to gel by first dispersing and hydrating the component at above its gelling temperature and cooling the resulting solution or sol, or through the addition of an effective cation either at elevated temperature or in the cold. Thus, this gelling agent may be dispersed and hydrated with or without heating. Examples of suitable cations which may be added to cause this gelling agent to gel are well known to persons skilled in the art and include $Na^+$, $Ca^{2+}$, $K^+$ and $H^+$. The cation may be added to a solution of this gelling component just prior to gelling or it may be present in the solution of gelling component in sequestered form and desequestered by any known method to cause the gelling component to gel. Examples of sequestering agents include sodium hexametaphosphate, sodium tripolyphosphate, EDTA, citric acid, sodium citrate and other citric acid salts, phosphoric acid, dicalcium phosphate and tetrasodium pyrophosphate. Desequestering is typically brought about by a change in the pH of the solution of the gelling agent.

However the gelling agent which produces the particulated gel is caused to gel, the gelling is carried out under shear so as to form the particulated gel.

The edible composition of the first embodiment may further include one or more hydrocolloids in one or more of the parts, in addition to the particulated gel. In this form of the first embodiment, and in the edible composition of the third embodiment of the invention, the hydrocolloid may be any hydrocolloid known for use in food applications. The hydrocolloid and the gelling agent which forms the particulated gel may be the same or different. The particulated gel may be prepared separately and added to a dispersed hydrated suspension or solution of the hydrocolloid component or the particulated gel may be formed in the presence of a dispersed hydrated suspension or solution of the hydrocolloid component. In one form of a process of the second embodiment, a particulated gel is suspended in a hydrocolloid in at least one part of the edible composition, and that part is filled into a suitable container together with the other part or parts of the composition, prior to setting the hydrocolloid component. It will be appreciated that in order to form a continuous phase of a hydrocolloid gel, the hydrocolloid is gelled under conditions of low shear.

Usually, in a process in which the particulated gel is formed in the presence of another gelling component, the two gelling components are different from each other and have different gelling properties, so that the gelling component which forms the particulated gel is capable of being gelled under conditions wherein the other gelling component remains as a sol. For example, in such a process a hydrated sol of both gelling components may be cooled through a temperature below which one, but not the other, forms a gel, while shear is applied. Under these conditions, the first gelling component forms a particulated gel suspended in a solution of the second gelling component. Further cooling of the mixture to below the gelling temperature of the second component causes the second component to set into a gel. Alternatively, the two gelling components may be the same. In such a composition, the same gelling component may be added in two portions and hydrated separately under different conditions. For example, the gelling component may be added and hydrated either hot or cold, and then suitable cations may be added or released with application of shear to form a particulated gel. A second portion of the same gelling component may then be added and hydrated in the presence of the particulated gel, to form an edible composition of the third embodiment or one part of an edible composition of the first embodiment. For example, the gelling component may be gellan, with gelling of a first portion of the gellan being caused by addition or release of cations and hydration of a second portion of the gellan being achieved by subsequently heating the mixture.

Typically a hydrocolloid component which forms a non-particulated hydrocolloid phase includes one or more components selected from the group consisting of gellan (native or deacylated), gelatin, alginate, propylene glycol alginate, pectin, carrageenan, furcelleran, agar, locust bean gum, guar gum, modified guar gum, cassia gum, tara gum, gum tragacanth, microcrystalline cellulose, processed eucheuma seaweed, sodium carboxymethylcellulose, methylcellulose and other modified cellulose derivatives, xanthan, native or modified starches, gelling proteins including whey proteins and caseinates. This component may be gelled by cooling or by chemical means, for example the addition of a suitable cation such as one of the cations exemplified herein above. This component may be dispersed and hydrated with or without heating and either in the presence or the absence of the gelling component which forms the particulated gel. One gelling component may be formed into a particulated gel before being added to a solution of the other gelling component, or the gelling components may be dispersed and hydrated together.

The particulated gel of the edible composition of the invention is formed under the application of shear to a solution or sol of the gelling component. Typically, shear is applied to a setting solution of the gelling component by vigorous stirring of the solution, such as by the use of a high-shear mixer, or by passage through a venturi or through a plate heat exchanger. Methods for the preparation of particulated gels by the gelation of a gelling agent under the application of shear are well known to persons of ordinary skill in the art.

The particle size range of the particulated gel is controlled by the degree of shear applied during gelling of the particulated gel. One way in which the novel texture of the edible composition of the present invention may be varied is thus by altering the degree of shear which is applied when the particulated gel is being formed.

Usually, an edible composition of the third embodiment of the present invention includes the gelling component which forms the particulated gel and the hydrocolloid component in a ratio of from about 1:100 by weight to about 5:1 by weight, more usually from about 1:20 to about 1:1 by weight, even more usually from about 1:5 to about 1:1.5 by weight, still more usually from about 1:2.5 to 1:2 by weight.

Typically, an edible composition of the third embodiment of the present invention and each part of an edible composition of the first embodiment includes from about 0.05 to 1% by weight of the gelling agent which forms the particulated gel, more typically from 0.05 to 0.5%, still more typically from 0.05 to 0.25%, based on the total weight of the composition or part. Where a hydrocolloid component is also included, the amount of the hydrocolloid component is usually from about 0.05 to 5% by weight of the composition or part, more typically from about 0.05 to 1% by weight, even more typically from about 0.05 to 0.7%, still more typically from about 0.05 to 0.5% by weight. It will be appreciated that the amount of the components utilised will depend on their nature, the desired food texture, and the temperature at which the composition is to be consumed. Given the teaching herein, a person of ordinary skill in the art can prepare edible compositions in accordance with the invention, having a range of desired textures, with no more than ordinary trial and error.

An edible composition of the present invention may also include one or more other components generally known for use in food products, such as flavourings, colourings, sugar and/or other sweeteners, preservatives, buffering agents, texturing agents, fats, colloids, suspended solids, etc, to give the food composition a desired texture and/or appearance. The amounts of such components use not critical to the invention and may be adjusted according to taste and according to the flavour/texture characteristics desired of the edible composition of the invention. The edible composition is typically neutral or acidic.

An edible composition of the present invention may be a frozen or a non-frozen product. When the edible composition of the invention is a frozen product, it will be appreciated that after gelling the gelling agent or agents present and filling the parts of the composition into a suitable container, a further step of freezing the edible composition is required.

Edible compositions of the present invention have a novel texture and/or appearance compared to food products which have been known hitherto. For example, a frozen composition of the present invention has a texture which provides a warmer eat, a jelly-like mouth feel and slow melt compared to known ice confections.

Edible compositions of the present invention may have any of a variety of appearances. The form of product presented to the consumer depends on the nature of the component or components of the composition which are included together with the particulated gel. The texture of the edible composition may be suitable for presentation of the composition for example as a custard, pudding, flan, demouldable flan, self-saucing flan or mousse and in a liquid, refrigerated, frozen or canned form.

In one form, the edible composition of the first embodiment may consist of one or more than one different edible compositions in accordance with the third embodiment of the invention. The edible composition may be provided in a suitable container such as a cup, tub or tube, or frozen in a block or on a stick, for example. The rheology of particulated gels has been discovered by the present inventors to make it possible to make use of novel filling systems to give the consumer product an attractive and novel appearance.

An edible composition of the invention may further include other edible components which may be filled into a container of the edible composition at the same time as, before, or after the parts of the edible composition which include the particulated gel(s). Examples of other edible components which may be included are sauces, fruits, syrups, custards, mousses, cream, jellies, puddings, cakes, biscuits, pastry, chocolate, candy and the like. In this form of the invention, the further component, such as a fruit syrup, is typically placed into a suitable container and the parts of the edible composition are filled onto it, substantially without mixing the parts.

In a process according to the second embodiment of the invention, two or more particulated gels are filled under conditions of low shear into a product container. The parts may be filled substantially simultaneously into the container, the filling being into different regions of the container, or consecutively. In the case of consecutive filling, the parts may be filled into the same or different regions of the container. For example, the gels may be filled simultaneously in a bottom up fashion, to produce two or more separate vertically segregated regions. Typically such regions are of contrasting appearance, such as colour. In a variation on this filling arrangement, the container may be rotated about the fillers during filling, which results in a product having a swirled or marbled appearance.

Another possible arrangement is for two or more particulated gels to be filled consecutively into the centre of a container. This produces a final product having concentric annularly segregated regions of different appearance.

Other possible filling schemes will be apparent to those skilled in the art.

In another form of the edible composition of the first embodiment, two or more parts of the edible composition each include two different gelling agents, one gelling agent of each two being capable of forming a particulated gel. In this form of the invention, the particulated gel is formed in each of the two parts under conditions in which the other gelling agent does not gel, resulting in a particulated gel suspended in a solution of the second gelling component, and two or more such suspensions are filled into the same container under conditions wherein there is substantially no mixing of the two suspensions so as to form a two part edible composition of the present invention. In this way, it is possible for gelled food products having attractive and novel appearances to be obtained.

In all cases, where a second gelling component is present in one or more of the parts of the edible composition, it may be caused to gel, if so desired, by lowering the temperature of the mixture and/or by release of suitable cations, after each of the particulated gels has been charged into the container.

BEST METHOD AND OTHER METHODS FOR CARRYING OUT THE INVENTION

Figure 1:
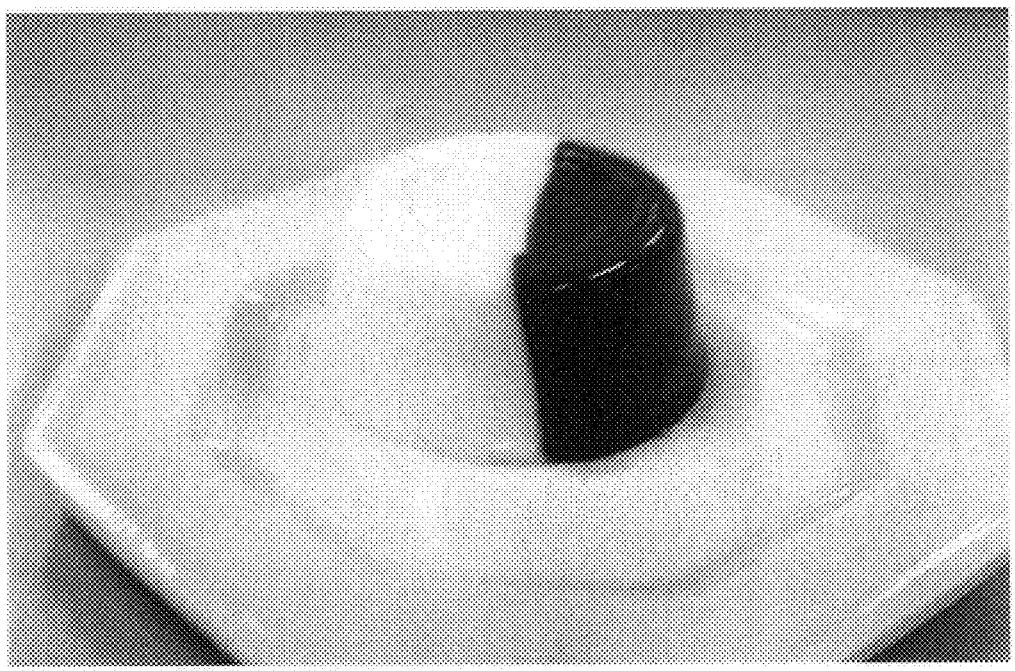
FIG. 1 is an illustration of an edible composition of the invention consisting of two substantially unmixed parts, in which the parts are segregated vertically in the edible composition.
Figure 2:
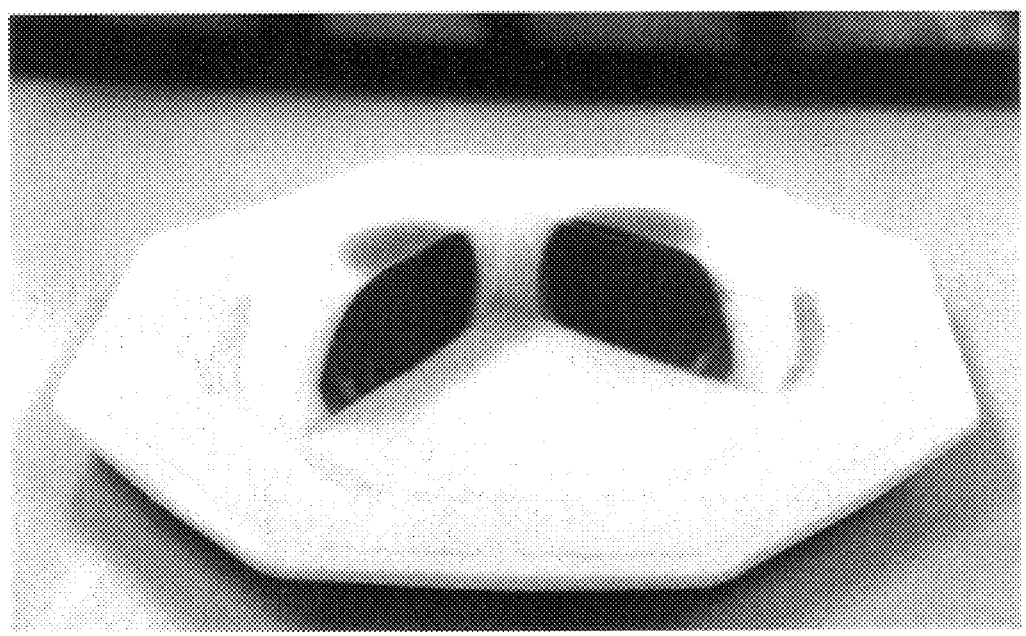
FIG. 2 is an illustration of an edible composition of the invention consisting of two substantially unmixed parts, in which the parts are segregated annularly in the edible composition.

One typical edible composition of the present invention, formulated as a water ice, has the following composition "X":

| Ingredient | % by weight |
| --- | --- |
| Gellan Gum | 0.05–0.30 |
| Locust Bean Gum | 0.05–0.20 |
| Sodium Citrate | 0.05–0.30 |
| Calcium Lactate | 0.01–0.10 |
| Citric Acid | 0–0.3 |
| Caster sugar | 15–30 |
| Maltodextrin | 0–10 |
| Flavour | As desired |
| Colour | As desired |
| Water | To 100 |

Another typical edible composition of the present invention, formulated as an ice confection, has the following composition "Y":

| Ingredient | % by weight |
| --- | --- |
| Gellan Gum | 0.05–0.25 |
| Carrageenan | 0.05–0.25 |
| Locust Bean Gum | 0.05–0.20 |
| Sodium Citrate | 0.05–0.20 |
| Calcium Chloride | 0.005–0.05 |
| Citric Acid | To desired pH |
| Sugar | 0–35 |
| Flavour | As desired |
| Colour | As desired |
| Water | To 100 |

Another typical edible composition of the present invention, formulated as a dairy dessert, has the following composition "Z":

| Ingredient | % by weight |
| --- | --- |
| Gellan Gum | 0.05–0.3 |
| Gelatine | 0.5–3.0 |
| Fresh Cream (35%) | 0–20 |
| Skim Milk Powder | 0–20 |
| Skim Milk | to 100 |
| Sodium Hexametaphosphate | 0.1–0.3 |
| Calcium Lactate | 0.01–0.15 |
| Sugar | 0–30 |
| Flavour | As desired |
| Colour | As desired |

In a typical two-part edible composition in accordance with the invention, each of the parts is an edible composition "X", "Y" or "Z" as described above.

Typical processes for preparing an edible composition of the third embodiment of the present invention, or one part of an edible composition of the first embodiment, are as follows, in which the gelling component which forms the particulated gel is referred to as "component A" and a second component, which forms a continuous phase of a hydrocolloid, is referred to "component B".

An edible composition of the first embodiment may be prepared by filling two or more parts prepared as described in Process 1, 2 or 3 below, into a suitable container under conditions of low shear prior to freezing the compositions or prior to causing component B to gel.

Process 1

Component A is dispersed in water and hydrated at a temperature of less than 40° C., preferably less than 25° C. An effective cation is then added or released by controlled desequestration whilst shear is applied, resulting in the formation of a particulated gel solution. The particulated gel solution is then added to a fluid composition containing component B prior to filling the composition into an appropriate package. The edible composition may then be frozen, and/or component B may be caused to gel.

Process 2

Component A is dispersed and hydrated (this may be in the presence of a cation if the cation is sequestered) by heating and is then cooled in the presence of any necessary cations, if required, (either released from their sequestered state or added to the fluid, containing component A in its hydrated form, as a solid or a component of a slurry) under shear to form a particulated gel solution. This particulated gel solution is then added to a fluid composition containing component B prior to filling the composition into an appropriate package. The edible composition may then be frozen and/or component B may be caused to gel.

In processes 1 and 2, components A and B may be the same or different.

Process 3

Component A is dispersed and hydrated together with component B and then cooling in the presence of an effective cation, if required, and sufficient shear to form a particulated gel solution within a fluid composition containing a continuous phase of component B. The mixture is then cooled and the mixture is filled into a suitable package prior to gelling component B by cooling the composition further. In this process, components A and B are different.

EXAMPLE

The following Examples illustrate the invention but are not intended to be in any way limitative of the invention.

Example 1
Two Part Dairy Dessert

| Ingredients | Milk Chocolate Base (% w/w) | White Chocolate Base (% w/w) |
| --- | --- | --- |
| Fresh Cream (35%) | 4.4 | 4.4 |
| Skim Milk powder | 5.8 | 5.8 |
| Skim Milk | To 100 | To 100 |
| Sucrose | 12 | 12 |
| Milk Chocolate | 6 | |
| White Chocolate | | 8 |
| Chocolate Flavour | | 0.3 |
| Cocoa | 1.5 | |
| Gellan Gum | 0.2 | 0.2 |
| Modified Starch | 1–3.0 | 1–3.0 |
| Calcium Lactate | 0.1 | 0.1 |
| Sodium Hexametaphosphate | 0.2 | 0.2 |

Process

The dairy dessert is prepared by first separately preparing the milk chocolate base and the white chocolate base. Each base is prepared by preblending the skim milk powder, sugar, gellan gum, starch and sodium hexametaphosphate. The preblend is then added to the cream and skim milk in a mix vessel with agitation. Any colouring and flavouring agents are then added with further agitation and the mix is heated to 90° C. and held at this temperature for 10 minutes. The calcium lactate and chocolate are then added with agitation and the mixture is cooled to approximately 10° C. under shear in preparation to be filled. When both mixes have been prepared and cooled to 10°, both mixes may be filled into a suitable container by whichever process is desirable to achieve a required visual effect.

Example 2
Two Flavour Water Ice

| Ingredients | Raspberry Flavour (% w/w) | Lime Flavour (% w/w) |
| --- | --- | --- |
| Maltodextrin | 3 | 3 |
| Caster Sugar | 27 | 27 |
| Calcium Lactate | 0.01 | 0.01 |
| Citric Acid | 0.2 | 0.2 |
| Gellan Gum | 0.2 | 0.2 |
| Locust Bean Gum | 0.1 | 0.1 |
| Sodium Citrate | 0.1 | 0.1 |
| Raspberry Colour and Flavour | As desired | |
| Lime Colour and Flavour | | As desired |
| Water | To 100 | To 100 |

Process

Both the Raspberry and Lime bases are prepared separately by the following process. The Gellan gum, locust bean gum, sodium citrate, sugar, maltodextrin, colour and flavour are preblended and added to the water with agitation. The mixture is heated to 90° C. and held at that temperature for 10 mins, then cooled under high shear while citric acid and calcium lactate are added. Shear is applied until the mix reaches <4° C., being below the gel point of the gellan gum, therefore forming a particulated gel in the food composition. Once both mixes have been prepared and cooled to <4° C., the two fluid mixes containing the particulated gel may be filled into ice block moulds simultaneously under conditions of low shear in a bottom up fashion, such that two vertically segregated regions are produced.

Example 3
Ice Confection

The following is an example of a formulation for an ice confection formed from an edible composition of the present invention.

| Ingredient | Percentage by weight |
| --- | --- |
| Gellan Gum | 0.10 |
| Carrageenan | 0.155 |
| Locust Bean Gum | 0.0845 |
| Sodium citrate | 0.10 |
| Calcium chloride | 0.01 |
| Citric acid | To adjust pH to 4.0 |
| Caster sugar | 15.53 |
| Flavour | As required |
| Colour | As required |
| Water | Balance |

In this example, the ice confection is formed by the following process steps:

1. The water is weighed into a mixing vessel.
2. The dry ingredients including Gellan, Carrageenan, Locust Bean Gum, Sodium citrate and Sugar are blended to form a preblend.
3. The preblend is added to the water with agitation.
4. The mix is then heated to 95° C. and held for 5 mins.

5. The mix is then cooled under high shear, the citric acid and calcium chloride being added at this point.
6. Shear is applied until the mix reaches 24° C., being below the gelling temperature of gellan gum, thereby forming a particulated gel of gellan.
7. The fluid composition containing the particulated gel is then filled into moulds. Cooling is continued in the moulds to below a temperature at which the carrageenan and locust bean gum set.
8. A stick is inserted into the gelled composition if desired and the moulds are frozen. Alternatively, the gelled composition may be returned to ambient temperatures after gelling and provided to consumers at ambient temperature.

Example 4
Dairy Dessert

The following is an example of a formulation for a dairy dessert formed from an edible composition of the present invention.

| Ingredient | % by weight |
| --- | --- |
| Gellan Gum | 0.2 |
| Gelatine | 1.05 |
| Fresh Cream (35%) | 4.4 |
| Skim Milk Powder | 5.8 |
| Skim Milk | to 100 |
| Sodium Hexametaphosphate | 0.2 |
| Calcium Lactate | 0.1 |
| Sugar | 12.0 |
| Flavour | As desired |
| Colour | As desired |

The dairy dessert is prepared by preblending the Skim Milk Powder, sugar, Gellan, Gelatine and Sodium hexametaphosphate and adding the preblend to the cream and skim milk in a mixing vessel with agitation. Any desired colouring and flavouring are then added with further agitation and the mix is heated to 90° C. and held at that temperature for 10 minutes. The calcium lactate is added with agitation, and the mixture is cooled to 30°C. under high shear. When the mixture has cooled to 30° C. it is filled into suitable containers and cooled to 4° C. The containers are stored under refrigeration.

Example 5
Ice Confection

| Ingredient | % by weight |
| --- | --- |
| Maltodextrin | 3.00 |
| Caster Sugar | 27.00 |
| Calcium Lactate | 0.01 |
| Citric acid | 0.20 |
| Gellan gum | 0.10 |
| Pectin | 0.05 |
| Sodium Citrate | 0.10 |
| Raspberry Colour and Flavour | As desired |
| Water | Balance |

The Gellan, pectin, sodium citrate, sugar, maltodextrin, colour and flavour are preblended and added to the water with agitation. The mixture is heated to 90° and held at that temperature for 10 mins, and then cooled under high shear while the citric acid and calcium lactate are added. Shear is applied until the mix reaches 2° C., being below the gelling temperature of the Gellan gum, therefore forming a particulated gel of Gellan gum. The fluid composition containing the particulated gel is then filled into moulds or appropriate packages. The product is then frozen. If required, a stick may be inserted at an appropriate time while the product is being frozen.

Example 6
Two-part Dairy Dessert

| Ingredient | Milk Chocolate Base (% w/w) | White Chocolate Base (% w/w) |
| --- | --- | --- |
| Fresh Cream (35% Fat) | 4.40 | 4.40 |
| Skim Milk Powder | 5.80 | 5.80 |
| Skim Milk | 68.75 | 68.25 |
| Sucrose | 12.00 | 12.00 |
| Milk Chocolate | 6.00 | |
| White Chocolate | | 8.00 |
| Chocolate Flavour | | 0.30 |
| Cocoa | 1.50 | |
| Gellan Gum | 0.20 | 0.20 |
| Gelatine | 1.05 | 1.05 |
| Calcium Lactate | 0.10 | 0.10 |
| Sodium Hexametaphosphate | 0.20 | 0.20 |

Process

Figure 3:
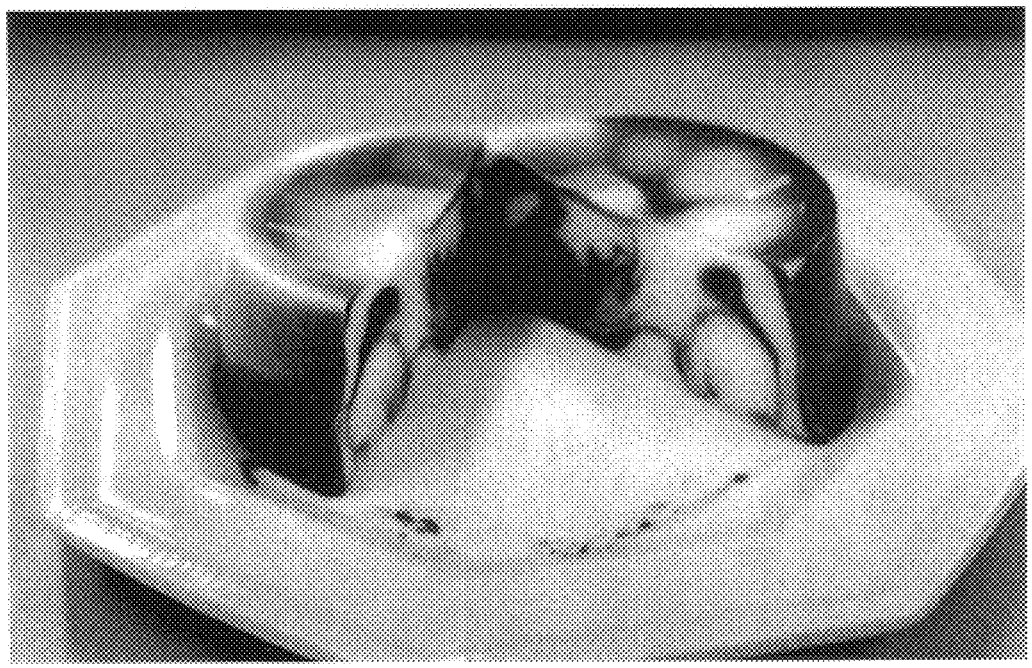
FIG. 3 is an illustration of an edible composition of the invention consisting of two substantially unmixed parts, in which the parts form a marbled appearance in the edible composition.

The dairy dessert is prepared by first separately preparing the milk chocolate base and the white chocolate base. Each base is prepared by preblending the skim milk powder, sugar, Gellan gum, gelatine, and sodium hexametaphosphate. The preblend is then added to the cream and skim milk in a mix vessel with agitation. Any desired colouring and flavouring agents are then added with further agitation and the mix is heated to 90° C. and held at this temperature for 10 minutes. The calcium lactate and chocolate are then added with agitation and the mixture is cooled to 30° C. under high shear. At this point one base is stored under agitation at 30° C. whilst the other is prepared. When both mixes have been prepared and brought to 30° C., both mixes may be filled into suitable containers by whichever process is desired to achieve the visual effects described above. For example, the mixes may be filled into a container through two separate low shear filling nozzles simultaneously, while the container is rotated, producing a product of marbled appearance, as illustrated in FIG. 3. After filling into suitable containers the products are cooled to 4° C. The containers are then stored at refrigerated temperatures.

Example 7
Fruit Juice Jelly

This product is a fruit jelly containing fruit juice. The product has unique rheological properties through the hydrocolloid blend and processing, that enable a two part vertically segregated water based juice jelly to be produced. Both parts can be flavoured and coloured differently.

| | Formulation | |
| --- | --- | --- |
| Ingredients | Orange Juice Base (% w/w) | Passionfruit Base (% w/w) |
| Gellan Gum | 0.1–0.2 | 0.1–0.2 |
| Sodium Citrate | 0.1–0.3 | 0.1–0.3 |
| Gelatine | 1.5–2.5 | 1.5–2.5 |
| Caster Sugar | 10–20 | 10–20 |

-continued

| Ingredients | Orange Juice Base (% w/w) | Passionfruit Base (% w/w) |
|---|---|---|
| Maltodextrin | 0–20 | 0–20 |
| Orange Juice Concentrate | 20 | |
| Passionfruit Concentrate | | 20 |
| Calcium Chloride | 0.1–0.3 | 0.1–0.3 |
| Water | To 100 | To 100 |

Procedure

The product is prepared in two steps, through the formation of an Orange Juice Base and a Passionfruit Base. Other flavour combinations may be used. Both Bases are produced by the following method and held at 45° C. with agitation until filling. Due to the rheology at filling the bases can be filled in different ways to form novel desserts. An example of this is filling the Orange and Passionfruit base simultaneously via a low shear bottom-up dual head filler whereby the bases are filled to produce a two-part vertically segregated dessert, as illustrated in FIG. 1.

Base Mix Preparation (For both Orange and Passionfruit Bases)

A preblend of the Gellan gum, sodium citrate, gelatine, sucrose and maltodextrin is prepared and mixed with the water with agitation. The mixture is heated to 90° C. and held for 10 minutes. The calcium chloride and juice concentrate are then added with agitation. The mixture is next cooled through the Gellan gum setting temperature to 45° C. under high shear. The first base preparation is maintained at 45° C. with constant agitation until the second base has been prepared. Then, the bases at 45° C. containing the particulated gel can be filled as desired into containers, which are stored under refrigeration.

Example 8
Ice Confections

The following products are a vegetable fat ice confection, and a fat-free ice confection. Although a formulation containing 6% by weight of vegetable fat is described, the amount of vegetable fat included may be varied from 0% to 6% by weight.

| Ingredients | 6% Veg Fat Mix, % w/w | 0% Veg Fat Mix, % w/w |
|---|---|---|
| Vegetable Fat | 6 | — |
| Skim Milk Solids | 8.2 | 8.2 |
| Whey Solids | 1.5 | 1.5 |
| Sucrose Solids | 12 | 12 |
| Glucose Syrup Solids | 4 | 4 |
| Gellan Gum | 0.1–0.2 | 0.1–0.2 |
| Gelatine | 0.2–0.8 | 0.2–0.8 |
| Sodium Hexametaphosphate | 0.1–0.3 | 0.1–0.3 |
| Calcium Lactate | 0.05–0.2 | 0.05–0.2 |
| Flavour/Colour | As Desired | As Desired |
| Water | To 100 | To 100 |
| Emulsifier - GMP | 0.05–0.3 | 0.05–0.3 |

Processing

A preblend of the Gellan gum, skim milk solids, whey solids, sucrose and glucose syrup solids, gelatine and sodium hexametaphosphate is prepared and added to the water with agitation. The mixture is heated to 70° C. and the vegetable fat is added, if used, with agitation. The mix is homogenised either through a Standard Homogeniser or through application of high shear. The mix is then heated to 90° C. and held for 10 minutes. Then the calcium lactate is added to the mix with agitation and it is cooled under high shear through the Gellan gum setting temperature to 30° C. The fluid composition containing the particulated gel is then filled at 30° C. into moulds. Cooling is continued in the moulds to below the setting temperature of the gelatine. Upon setting of the gelatine, a stick may be inserted if desired and the moulds frozen.

Example 7
Freeze/Thaw Stable Mousse

This formulation is for a freeze/thaw stable aerated mousse product. The formulation can be produced through a standard ice cream freezer and drawn at extrusion temperatures above or below 0° C. The formulation, when processed through an ice cream freezer, can achieve up to 100% overrun.

| Ingredients | % by weight |
|---|---|
| Fresh Cream (35% Fat) | 4.40 |
| Skim Milk Powder | 5.80 |
| Skim Milk | To 100 |
| Milk Chocolate | 6.00 |
| Sugar Caster | 12.00 |
| Gellan Gum | 0.1–0.2 |
| Gelatine | 0.5–1.5 |
| Sodium Hexametaphosphate | 0.1–0.3 |
| Cocoa | 1.5 |
| Calcium Lactate | 0.05–0.2 |

Procedure

A preblend of the skim milk powder, cocoa, caster sugar, Gellan gum, gelatine and sodium hexametaphosphate is prepared. The cream and skim milk are put into a mixing vessel and the preblend is added with agitation. The mixture is then heated to 90° C. and held for 10 minutes. The milk chocolate and calcium lactate are then added with agitation. The mixture is next cooled under high shear to 15° C., which is below the Gellan setting point, to form a fluid composition containing a particulated gel.

This mix is processed through an ice cream freezer, drawing the product at an extrusion temperature between −6° C. and +4° C. depending on the texture required. The product can obtain up to 100% overrun. The product is packaged into containers and stored under either refrigerated or frozen conditions. If frozen, the product is to be thawed and consumed chilled. The product is freeze/thaw stable.

Example 8
Ice Confection

This formulation is for an ice confection using a single hydrocolloid gelling agent.

| Ingredients | % by weight |
|---|---|
| Maltodextrin | 3 |
| Caster Sugar | 27 |
| Gellan gum 1 | 0.2 |
| Gellan gum 2 | 0.05 |

-continued

| Formulation | |
|---|---|
| Ingredients | % by weight |
| Locust bean gum | 0.1 |
| Citric acid | 0.2 |
| Sodium citrate | 0.14 |
| Raspberry colour and flavour | as desired |
| Raspberry colour and flavour | as desired |
| Calcium lactate | 0.01 |
| Water 1 | 10 |
| Water 2 | to 100 |

Procedure

Water component 2 is added to a mixing vessel and the sugar, maltodextrin, gellan gum 1, sodium citrate are added with agitation. Mixing is continued for 15 minutes while a preblend of the remaining dry ingredients is mixed with water component 1 to form a slurry. The slurry is added to the mix vessel and the mixture is mixed under high shear, to produce a particulated gel. After 5 minutes mixing, the mixture is heated to 95° C. and held at that temperature for 5 minutes to hydrate gellan gum component 2. After this time, the mixture is cooled to 60° C. and is poured into moulds. Cooling is then continued to a temperature below the gel set point of the hydrocolloid (gellan). A stick may be inserted if desired and optionally the moulds may be frozen. Alternatively the moulds may be returned to ambient temperature after gelling and provided to consumers at or near ambient temperature.

What is claimed is:

1. An edible composition having a first part including a first particulated gel of a first gelling component and at least one other part including a second particulated gel of a second gelling component, said first part being substantially unmixed with said other part or parts, wherein said first and second particulated gels are obtained by causing said first and second gelling components to gel under the application of shear.

2. An edible composition, including a particulate gel formed by causing a gelling component to gel under application of shear, said particulated gel suspended in a continuous phase of a hydrocolloid gel formed substantially in the absence of shear.

3. An edible composition according to claim 1 or claim 2 wherein each particulated gel is selected from the group consisting of native gellan, de-acylated gellan, agar, alginate, modified alginates, pectin, iota-carrageenan, kappa-carrageenan, furcelleran and mixtures thereof.

4. An edible composition according to claim 3, wherein each particulated gel is selected from the group consisting of native gellan and de-acylated gellan.

5. An edible composition according to claim 1, wherein at least one of said parts further includes at least one hydrocolloid.

6. An edible composition according to claim 2 or claim 5, wherein said hydrocolloid is selected from the group consisting of native gellan, deacylated gellan, gelatin, alginate, propylene glycol alginate, pectin, carrageenan, furcelleran, agar, locust bean gum, guar gum, cassia gum, tara gum, gum tragacanth, microcrystalline cellulose, processed eucheuma seaweed, sodium carboxymethylcellulose, methylcellulose and other modified cellulose derivatives, xanthan, native starch, modified starch, whey proteins, caseinates, and mixtures thereof.

7. An edible composition according to claim 6 wherein said particulated gel and said hydrocolloid are the same.

8. A process for preparing an edible composition, including
   (i) causing a first gelling component to form a first particulated gel under the application of shear;
   (ii) causing a second gelling component to form a second particulated gel under the application of shear;
   (iii) providing a first part including said first particulated gel;
   (iv) providing at least one other part including said second particulated gel;
   (v) filling said first part into a container;
   (vi) filling said other part or parts into said container substantially without mixing said first part with said other part or parts.

9. A process for preparing an edible composition including a particulated gel suspended in a continuous phase of a hydrocolloid gel, the process including providing a solution including a first gelling component and a hydrocolloid component, causing said first gelling component to gel under the application of shear, thereby forming a particulated gel, and thereafter causing said hydrocolloid component to gel.

10. A process according to claim 8 or claim 9 wherein said particulated gel is selected from the group consisting of native gellan, de-acylated gellan, agar, alginate, modified alginates, pectin, iota-carrageenan, kappa-carrageenan, furcelleran and mixtures thereof.

11. A process according to claim 10, wherein said particulated gel is selected from the group consisting of native gellan and de-acylated gellan.

12. A process according to claim 8, wherein at least one of said parts further includes at least one hydrocolloid.

13. A process according to claim 9 or claim 12, wherein said hydrocolloid is selected from the group consisting of native gellan, deacylated gellan, gelatin, alginate, propylene glycol alginate, pectin, carrageenan, furcelleran, agar, locust bean gum, guar gum, cassia gum, tara gum, gum tragacanth,, microcrystalline cellulose, processed eucheuma seaweed, sodium carboxymethylcellulose, methylcellulose and other modified cellulose derivatives, xanthan, native starch, modified starch, whey proteins, caseinates and mixtures thereof.

14. A process according to claim 13 wherein said particulated gel and said hydrocolloid are the same.

15. A process according to claim 8 wherein filling steps (v) and (vi) are performed substantially simultaneously.

* * * * *